Inventor:
Calvin Dowell

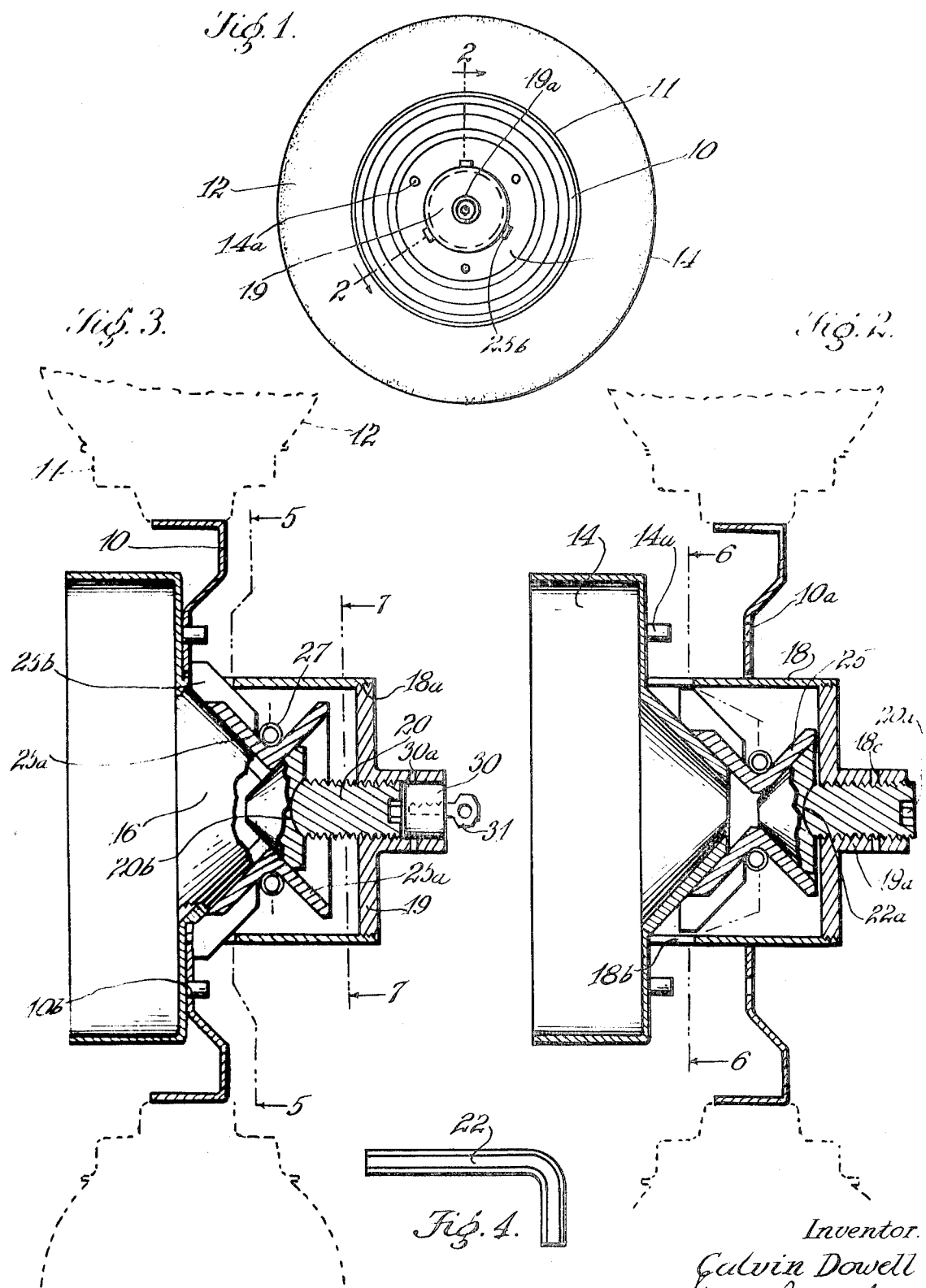

United States Patent Office 3,516,270
Patented June 23, 1970

3,516,270
AUTO WHEEL LOCKS
Calvin Dowell, 298 Boyd St., Ripley, Tenn. 38063
Filed June 20, 1968, Ser. No. 738,504
Int. Cl. E05b 65/12
U.S. Cl. 70—259          8 Claims

ABSTRACT OF THE DISCLOSURE

A lock to prevent the unauthorized removal of an automobile wheel. The brake drum of the wheel carries locating pins for mounting a conventional wheel, and is extended with a cylindrical housing through the large central opening of the wheel. The brake drum also extends with a cone into the housing which serves to expand a split chuck when the latter is advanced on the cone. When the wheel is located against the brake drum and the chuck is advanced as stated, a set of radial lugs extended from the sections of the chuck overlap the inner portion of the wheel to keep it against the brake drum. A screw from the center of the housing uses a plunger to advance the chuck when the screw is turned toward it by a wrench. Now room develops behind the screw in a housing hub for the insertion of a key-lock cylinder with tumbler pins projecting into the hub wall when the key is turned to lock. The removal of the key leaves the locked cylinder as a bar against access to or removal of the screw, so that the radial lugs remain in locking engagement with the wheel.

---

My invention relates to locks designed to prevent the unauthorized removal of the wheels of automobiles, and has for its main object to provide a lock which holds an automobile wheel in supported engagement with the brake drum until a key is used to release the wheel for removal.

A further object is to provide a lock of the above character which is fully concealed within the hub cap of the wheel.

Another object is to provide a lock which secures the wheel to the brake drum, or releases it from the same by the mere turn of a key and use of a small wrench, eliminating the usual retaining bolts and the large wrench employed to secure or remove them.

An additional object is to construct the lock with a feed screw which is effective to expand a set of lugs into retentive engagement with the wheel, access to the screw being controlled by a key-operated lock.

A still further object is to design the lock along lines of sturdiness and simplicity.

A better understanding of the invention may be gained by reference to the accompanying drawing, in which:

FIG. 1 is a face view of a typical automobile wheel with the hub cap removed, and showing the wheel lock engaged;

FIG. 2 is a magnified section on the line 2—2 of FIG. 1 with the key-lock removed, and showing the wheel lock released;

FIG. 3 is a view similar to FIG. 2, showing the wheel lock engaged and the key-lock applied to lock the wheel against removal;

FIG. 4 is a view of an Allen wrench usable to operate the wheel lock;

Figure 5:
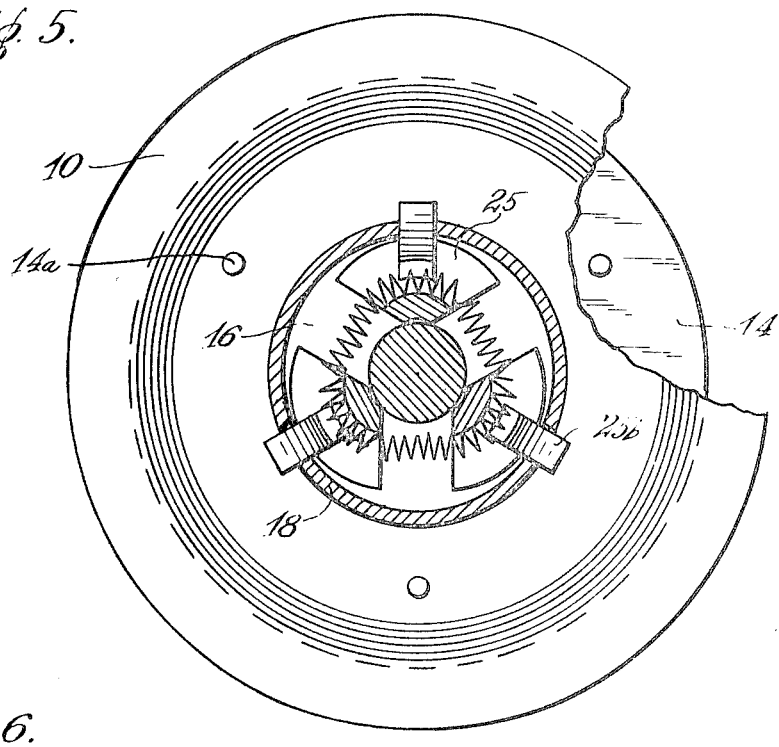
Figure 6:
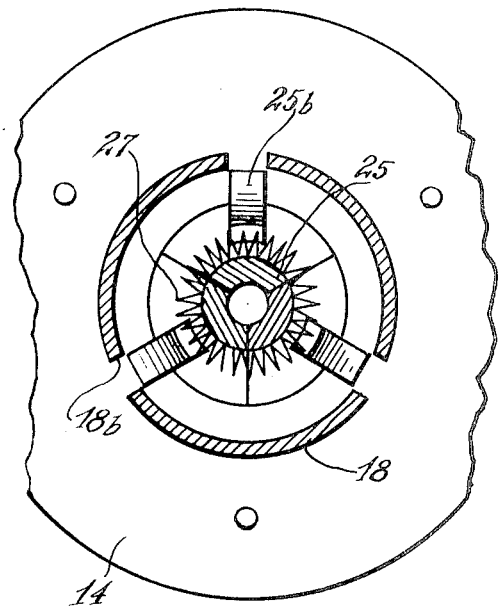
Figure 7:
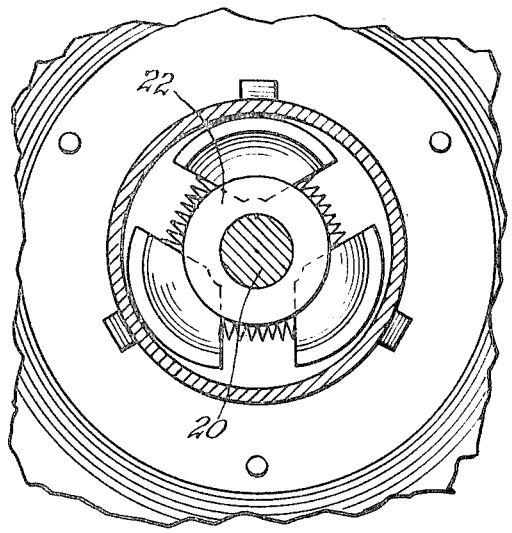

FIGS. 5 and 6 are sections on the lines 5—5 and 6—6 of FIGS. 3 and 2, respectively; and FIG. 7 is a section on the line 7—7 of FIG. 3.

Referring specifically to the drawings, 10 denotes a typical automobile wheel adapted to receive a rim 11 and a tire 12. The wheel is applied to a brake drum 14, but not secured to the same by the conventional set of bolts. Instead, the wheel is supported on the brake drum by being made with a set of perforations 10a receiving pins 14a from the face of the brake drum. Automobile wheels are made with a large central opening 10b.

The mechanism of the present wheel lock requires that the brake drum 14 be extended from the central region with a hollow cone 16 of a basic diameter somewhat less than the wheel opening 10b. For the purpose of the wheel lock, the brake drum is also extended with a cylindrical housing 18 enclosing the cone 16, the housing being tapped in its rear end—as indicated at 18a—to receive a closure plate 19; and the latter is extended in the center with a tubular hub 19a. As seen in FIG. 2, the hub is tapped to accommodate a screw 20 formed in its rear end with a socket 20a suitable for receiving one end of an Allen wrench 22, such as illustrated in FIG. 4. The forward end of the screw 20 is convex—as indicated at 20b—to seat in a matching rear cavity 22a of a conical plunger 22.

A double-ended chuck 25 is interposed between the plunger 22 and the cone 16 as seen in FIG. 2, the chuck having conical end-cavities 25a suitable for seating the plunger from the rear and the cone from the front, as shown. FIGS. 5 to 7 indicate that the chuck is split three ways; and the neck of the chuck is encircled by a coil spring 27—as shown in FIG. 6—to hold the sections of the chuck together.

FIGS. 2 and 6 show that each section of the chuck 25 is extended from the middle with a radial lug 25b. When the wheel lock is disengaged the lugs are in gathered position just inside the periphery of the housing 18; and the tips of the lugs register with slots 18b made in the wall of the housing.

When the wheel is to be mounted and locked, it is slid over the housing from the position of FIG. 2 in forward direction to become located by receiving the brake drum pins 14a in the perforations 10a, and rest against the face of the brake drum as seen in FIG. 3. The wrench 22 is now applied to the rear end of the screw 20 to advance the same. The screw will push the plunger in forward direction with the effect of expanding the chuck 25 and causing it to advance on the cone 16 to a point where the radial lugs 25b engage the wheel 10 as seen in FIG. 3; and this engagement is of course made tight by final pressure on the wrench. During the advance of the chuck the spring 27 simply expands, as indicated in FIGS. 5 and 7.

With the wheel secured as just stated, means are provided to lock it against removal. In this respect FIG. 3 shows that the screw 20 in its advanced position leaves room in the rear end of the housing hub 19a for the insertion of a cylinder lock 30 controlled by a key 31. The lock 30 extends tumbler pins 30a into alined bores 18c of the housing hub 19a as shown, so that the screw 22 is thus locked against access and retraction to anyone who does not have the key 31; and the latter may be kept with the keys to the automobile for handy use in case the wheel must be removed because of a tire change or repair.

It will now be apparent that the novel wheel lock is a simple and sturdy mechanism whose operation to lock the wheel is positive, since no springs or other delicate parts are depended upon to procure the locking action. Further, the engagement of the locking lugs can be so tight as to hold the wheel in firm engagement with the brake drum, making the conventional wheel bolts and the effort of applying or removing them unnecessary. Further, the hollow construction of the cone 16 provides a clearance for the usual axle stub of the front wheel which projects from the brake drum. Further, while the housing 18 and its hub 19a have been drawn with considerable depth for purposes of clarity, it goes without saying that their actual design would be more compact in order to accommodate a hub cap which is not unusually deep or conspicuous. Further, it will be noted that the cylinder lock 30 is always included in the wheel lock when the latter is engaged, and only removed temporarily while the wheel is unlocked or removed. Finally, making the conical plunger 22 separate from the screw 20 limits the plunger to direct impinging action without turning and possible rotary strain on the clutch sections; and what friction may occur between the tip of the screw and the plunger may be considered negligible. Also, the plunger will always remain in engagement with the screw because the constricting influence of the spring 27 will cause the chuck to back the plunger on a receding movement of the screw.

I claim:

1. A lock for a vehicle wheel and brake drum, comprising in combination:
  a brake drum including axially projecting means for orienting a vehicle wheel thereon; and
  a vehicle wheel including portions corresponding to said means for orienting said wheel whereby the wheel is removably supported on said drum, the improvement:
  said brake drum including an axial camming surface surrounded by an axial cylinder,
  said cylinder including openings adjacent a portion of said brake drum,
  a radially expansible chuck supported for axial movement on said camming surface and including radial lug means corresponding said openings for engaging said wheel and retaining it against said brake drum; and
  chuck expanding means supported on said cylinder for axial movement relative to said camming surfacing and expanding said chuck.

2. The structure as claimed in claim 1 in which said camming surface comprises an axial cone integral with said brake drum.

3. The structure as claimed in claim 1 in which said radially-expansible chuck includes spring means normally urging said chuck toward a contracted condition.

4. The structure as claimed in claim 1 in which said cylinder includes an end wall on which said chuck-expanding means is mounted.

5. The structure as claimed in claim 1 in which said chuck comprises a plurality of elements, each of said elements including at least one of said radial lugs, and a spring circumposed about said chuck and normally drawing said elements radially inwardly.

6. The structure as claimed in claim 1 in which said chuck expanding means comprises an axially adjustable force-transmitting screw, an axially displaceable plunger inwardly of said screw and engageable thereby, said plunger being engageable within said chuck and including a camming portion for urging said chuck outwardly.

7. The structure as claimed in claim 6 in which said plunger comprises a cone element having an axial recess terminally engaged by said force-transmitting screw.

8. The structure as claimed in claim 1 including a key-operated lock assembly removably received on said cylinder and controlling access to said chuck expanding means.

References Cited

UNITED STATES PATENTS

| | | | |
|---|---|---|---|
| 2,599,120 | 6/1952 | Meiling | 301—9 |
| 2,628,132 | 2/1953 | Trapp | 301—9 |
| 2,995,402 | 8/1961 | Lyon | 301—37 |
| 3,392,557 | 7/1968 | Solow | 70—240 |

MARVIN A. CHAMPION, Primary Examiner

R. L. WOLFE, Assistant Examiner

U.S. Cl. X.R.

301—9